United States Patent
Suzuki et al.

(10) Patent No.: US 7,313,349 B2
(45) Date of Patent: Dec. 25, 2007

(54) TONER CONTAINER AND IMAGE FORMING APPARATUS

(75) Inventors: Masato Suzuki, Numazu (JP);
Yoshihide Kawamura, Numazu (JP);
Masahiro Nakayama, Susono (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/498,768

(22) Filed: Aug. 4, 2006

(65) Prior Publication Data

US 2007/0077100 A1 Apr. 5, 2007

Related U.S. Application Data

(63) Continuation of application No. PCT/JP2005/001729, filed on Jan. 31, 2005.

(30) Foreign Application Priority Data

Feb. 6, 2004 (JP) .............................. 2004-030492

(51) Int. Cl.
*G03G 15/08* (2006.01)
(52) U.S. Cl. ....................................... 399/258; 399/262
(58) Field of Classification Search ................ 399/119, 399/120, 258, 262, 263; 222/167, 169, 325, 222/367, 414, 564, DIG. 1
See application file for complete search history.

(56) References Cited

U.S. PATENT DOCUMENTS

| 4,878,603 | A | 11/1989 | Ikesue et al. |
| 5,441,177 | A | 8/1995 | Yanagisawa |
| 5,455,662 | A | 10/1995 | Ichikawa et al. |
| 5,557,382 | A | 9/1996 | Tatsumi et al. |
| 5,648,840 | A | 7/1997 | Ikunami et al. |

(Continued)

FOREIGN PATENT DOCUMENTS

EP 0 435 596 7/1991

(Continued)

OTHER PUBLICATIONS

Patent Abstracts of Japan, JP 09-197783, Jul. 31, 1997.

(Continued)

*Primary Examiner*—Robert Beatty
(74) *Attorney, Agent, or Firm*—Oblon, Spivak, McClelland, Maier & Neustadt, P.C.

(57) ABSTRACT

The object of the present invention is to provide toner bottles and the like in which the possibility to damage the ring gear, in particular the teeth of the ring gear, is remarkably suppressed at processing the toner bottle such as handling, packaging, and transporting, thus packaging and transporting are principally possible without cushioning materials. Accordingly, provided is a toner bottle comprising a cylindrical bottle having a bottom, a cylindrical aperture for supplying a toner, and a ring gear, wherein a helical concave is formed on the side wall of the cylindrical bottle along the axis of the cylindrical bottle, the cylindrical aperture is disposed at one end of the cylindrical bottle, the cylindrical aperture is concentric with the cylindrical bottle, and the outside diameter of the cylindrical aperture is smaller than the outside diameter of the cylindrical bottle, the ring gear is disposed on the cylindrical aperture, the ring gear is concentric with the cylindrical aperture, and the tip circle diameter of the ring gear is smaller than the outside diameter of the cylindrical bottle.

18 Claims, 12 Drawing Sheets

U.S. PATENT DOCUMENTS

| | | | |
|---|---|---|---|
| 5,659,860 A | 8/1997 | Sasaki et al. | |
| 5,722,014 A | 2/1998 | Fike | |
| 5,722,019 A | 2/1998 | Nakajima | |
| 5,754,916 A | 5/1998 | Kitayama et al. | |
| 5,758,235 A | 5/1998 | Kosuge et al. | |
| 5,765,059 A | 6/1998 | Kosuge et al. | |
| 5,765,079 A | 6/1998 | Yoshiki et al. | |
| 5,768,664 A | 6/1998 | Kosuge et al. | |
| 5,774,773 A * | 6/1998 | Otsuka et al. | 399/262 |
| 5,794,108 A | 8/1998 | Yoshizawa et al. | |
| 5,828,935 A | 10/1998 | Tatsumi et al. | |
| 5,890,040 A | 3/1999 | Matsuoka et al. | |
| 5,909,610 A | 6/1999 | Yoshiki et al. | |
| 5,913,097 A | 6/1999 | Nakano et al. | |
| 5,915,155 A | 6/1999 | Shoji et al. | |
| 5,966,574 A | 10/1999 | Ui et al. | |
| 5,970,290 A | 10/1999 | Yoshiki et al. | |
| 6,104,900 A | 8/2000 | Ishikawa et al. | |
| 6,118,951 A | 9/2000 | Kato et al. | |
| 6,125,243 A | 9/2000 | Shoji et al. | |
| 6,141,520 A | 10/2000 | Kosuge | |
| 6,163,666 A | 12/2000 | Hosokawa et al. | |
| 6,185,401 B1 | 2/2001 | Kanamori et al. | |
| 6,198,895 B1 | 3/2001 | Tsuda et al. | |
| 6,212,343 B1 | 4/2001 | Hosokawa et al. | |
| 6,256,469 B1 * | 7/2001 | Taniyama et al. | 399/258 |
| 6,266,501 B1 | 7/2001 | Mizuishi et al. | |
| 6,289,195 B1 * | 9/2001 | Ichikawa et al. | 399/262 |
| 6,336,020 B1 | 1/2002 | Ishikawa et al. | |
| 6,337,957 B1 | 1/2002 | Tamaki et al. | |
| 6,363,237 B1 | 3/2002 | Nagame et al. | |
| 6,366,755 B1 | 4/2002 | Takashima | |
| 6,393,241 B1 | 5/2002 | Matsumoto et al. | |
| 6,447,973 B1 | 9/2002 | Asami et al. | |
| 6,493,529 B1 | 12/2002 | Umemura et al. | |
| 6,501,913 B2 | 12/2002 | Hattori et al. | |
| 6,507,720 B2 | 1/2003 | Kabumoto et al. | |
| 6,521,386 B1 | 2/2003 | Sakon et al. | |
| 6,522,855 B1 | 2/2003 | Katoh et al. | |
| 6,558,862 B2 | 5/2003 | Kojima et al. | |
| 6,560,431 B2 | 5/2003 | Hosokawa | |
| 6,562,529 B1 | 5/2003 | Kojima et al. | |
| 6,567,637 B2 | 5/2003 | Yanagisawa et al. | |
| 6,591,077 B2 | 7/2003 | Yanagisawa et al. | |
| 6,615,013 B2 | 9/2003 | Arai et al. | |
| 6,628,908 B2 | 9/2003 | Matsumoto et al. | |
| 6,665,508 B2 | 12/2003 | Sudo et al. | |
| 6,775,503 B2 | 8/2004 | Hattori et al. | |
| 6,826,381 B2 | 11/2004 | Muramatsu et al. | |
| 6,898,407 B2 | 5/2005 | Noguchi et al. | |
| 6,937,838 B2 | 8/2005 | Ishii et al. | |
| 7,043,173 B2 | 5/2006 | Grune et al. | |
| 2002/0102112 A1 | 8/2002 | Hung-Hsu | |
| 2002/0102113 A1 | 8/2002 | Kusano et al. | |
| 2003/0116923 A1 | 6/2003 | Meetze et al. | |
| 2003/0117892 A1 | 6/2003 | Litwiller | |
| 2003/0156861 A1 | 8/2003 | Nagano et al. | |
| 2004/0009015 A1 | 1/2004 | Fujimori et al. | |
| 2004/0096239 A1 | 5/2004 | Hosokawa et al. | |
| 2004/0126150 A1 | 7/2004 | Noguchi et al. | |
| 2004/0131381 A1 | 7/2004 | Kawasumi et al. | |
| 2004/0165913 A1 | 8/2004 | Hattori | |
| 2004/0170446 A1 | 9/2004 | Nagashima et al. | |
| 2004/0170447 A1 | 9/2004 | Arai et al. | |
| 2004/0184841 A1 | 9/2004 | Tsuda et al. | |
| 2004/0208676 A1 | 10/2004 | Ishii et al. | |
| 2004/0223790 A1 * | 11/2004 | Hosokawa et al. | 399/258 |
| 2004/0240908 A1 | 12/2004 | Deguchi et al. | |
| 2004/0258432 A1 | 12/2004 | Hattori et al. | |
| 2004/0265011 A1 | 12/2004 | Tsuda et al. | |
| 2005/0008393 A1 | 1/2005 | Kuma et al. | |
| 2005/0008398 A1 | 1/2005 | Hattori | |
| 2005/0036810 A1 | 2/2005 | Murakami et al. | |
| 2005/0084293 A1 | 4/2005 | Fukuchi et al. | |
| 2005/0158071 A1 | 7/2005 | Hosokawa et al. | |
| 2005/0169653 A1 | 8/2005 | Noguchi et al. | |

FOREIGN PATENT DOCUMENTS

| | | |
|---|---|---|
| EP | 0 616 268 | 9/1994 |
| EP | 0 779 561 | 6/1997 |
| EP | 0 801 337 | 10/1997 |
| EP | 1 022 620 | 7/2000 |
| EP | 1 120 691 | 8/2001 |
| EP | 1 220 051 | 7/2002 |
| JP | 60-146265 | 8/1985 |
| JP | 04-000477 | 1/1992 |
| JP | 04-123074 | 4/1992 |
| JP | 06-59576 | 3/1994 |
| JP | 06-110331 | 4/1994 |
| JP | 6-266227 | 9/1994 |
| JP | 7-20705 | 1/1995 |
| JP | 07-043999 | 2/1995 |
| JP | 8-137176 | 5/1996 |
| JP | 09-90727 | 4/1997 |
| JP | 09-160364 | 6/1997 |
| JP | 9-251240 | 9/1997 |
| JP | 9-311535 | 12/1997 |
| JP | 10-63084 | 3/1998 |
| JP | 10-142913 | 5/1998 |
| JP | 11-184232 | 7/1999 |
| JP | 2000-105494 | 4/2000 |
| JP | 2000-172058 | 6/2000 |
| JP | 2000-172059 | 6/2000 |
| JP | 2000-187378 | 7/2000 |
| JP | 2000-221766 | 8/2000 |
| JP | 2000-275941 | 10/2000 |
| JP | 3120723 | 10/2000 |
| JP | 2000-310901 | 11/2000 |
| JP | 2000-338758 | 12/2000 |
| JP | 2001-5286 | 1/2001 |
| JP | 2001-27839 | 1/2001 |
| JP | 2001-125359 | 5/2001 |
| JP | 2001-265102 | 9/2001 |
| JP | 2002-6601 | 1/2002 |
| JP | 2002-139905 | 5/2002 |
| JP | 2002-169365 | 6/2002 |
| JP | 2002-221858 | 8/2002 |
| JP | 2002-244359 | 8/2002 |
| JP | 2002-268357 | 8/2002 |
| JP | 2002-268295 | 9/2002 |
| JP | 2002-276466 | 9/2002 |
| JP | 2002-357945 | 12/2002 |
| JP | 3384914 | 12/2002 |
| JP | 2004-139031 | 5/2004 |

OTHER PUBLICATIONS

Patent Abstracts of Japan, JP 11-202606, Jul. 30, 1999.
Patent Abstracts of Japan, JP 11-288157, Oct. 19, 1999.
Patent Abstracts of Japan, JP 2000-214669, Aug. 4, 2000.

* cited by examiner

Compressed Air

TONER CONTAINER AND IMAGE FORMING APPARATUS

CROSS-REFERENCE TO RELATED APPLICATIONS

This is a continuation of Application No.PCT/JP2005/001729, filed on Jan. 31, 2005.

BACKGROUND OF THE INVENTION

1. Field of the Invention

The present invention relates to toner bottles for supplying toners to electrophotographic image forming apparatuses such as copiers, facsimiles, and printers, processes for producing the toner bottles, toner containers comprising the toner bottle and a cap, toner cartridges comprising the toner container and a toner, image forming apparatuses equipped with the toner cartridge, and image forming processes. In the present invention, the term "toner" as used is meant broader sense and the meaning extends to developers utilized commercially.

2. Description of the Related Art

In conventional electrophotographic image forming apparatuses, developers are supplied in a way that a container containing a developer is horizontally mounted to a main body of image forming apparatuses in an attachable and detachable manner, then the container is rotated around the axis of the container.

Japanese Patent Application Laid-Open (JP-A) Nos. 60-146265 and 9-311535 disclose, in such devices for supplying a developer or container for supplying a developer, a gear for driving rotatably a cylindrical container or a driven gear that is mounted concentrically to a body of a developer container. These containers for supplying a developer are constructed such that an aperture for supplying a developer is formed at one end of a cylindrical container main body having a bottom, and that helical concave portions are formed along the axis; the toner is guided and conveyed by the helical concave portions by rotating the container main body around the axis while maintaining the axis in an approximately horizontal direction; thereby the toner is supplied to the developing portion through the supplying aperture of image forming apparatuses.

Specifically, as described in JP-A No. 60-146265, a toner cartridge of a toner supplying device is constructed as shown in FIG. 8, for example; reference number 80 in FIG. 8 denotes a toner cartridge, 81 denotes the aperture for supplying a toner, 82 denotes a helical rib, 83 denotes a ring gear as a driven gear for rotating toner cartridge 80, and 84 denotes the helical concave portion formed by helical rib 82 for conveying the toner.

Further, the device for supplying a developer described in JP-A No. 9-311535 is so constructed that the residual toner amount that deposits on inner surface of toner containers may be minimized. As shown in FIG. 9, ring gear 95 is provided at the side of outlet aperture 92 of toner bottle 91 as a driven gear, the gear 95 is engaged with driving gear 97 of which the teeth are partly eliminated intentionally; intermittent rotating motion of toner bottle 91 may cause vibration to the toner bottle. In FIG. 9, reference number 93 denotes the axis of the toner bottle, 94 denotes a helical guiding protection for the inner face that forms helical concave 94a for conveying toner, 96 denotes a driving motor, and T denotes a toner.

However, developer supplying containers in the prior art such as toner cartridge 80 shown in FIG. 8 and the toner bottle shown in FIG. 9 are is each equipped with a driven gear of which the tip circle diameter or outside diameter of the gear is larger than the diameter of the bottle body, and constructed such that the driven gear is disposed concentric with the bottle body. Therefore, the outer periphery of driven gears extends outward from the outer face of bottle bodies, thus, the teeth often suffer from damages at handling containers such as packaging and transporting. In order to avoid such a problem, the developer supplying containers should be packaged and transported along with a specific cushioning material.

Typically, the conventional developer supplying containers are molded products of plastics. These molded products are typically produced by a direct blow molding method. Alternatively, these are produced primarily by injection molding, then the resulting primary body is inserted into a specific mold and subjected to biaxial stretching blow molding under certain conditions. However, since the intended shape is that a ring gear is provided on the outer side where a helical concave is formed on a container body, the mold construction of the injection molding or the biaxial stretching blow molding is considerably complicated; in addition, since the ring gear is disposed at the thinner portion of the bottle body, there exist some problems that the rib construction is likely to be complicated, and the thickness of the bottle body should be increased.

SUMMARY OF THE INVENTION

An object of the present invention is to provide a toner bottle in which the possibility to damage the ring gear, in particular the teeth of the ring gear, is remarkably suppressed at processing the toner bottle such as handling, packaging, and transporting; thus packaging and transporting without cushioning materials are principally enabled; and also to provide a process for producing the toner bottle, a toner container comprising the toner bottle and a cap, a toner cartridge comprising the toner container filled with a toner, an image forming apparatus equipped with the toner cartridge, and an image forming process.

Another object of the present invention is to provide a toner bottle in which the bottle body as a wall thickness which is not necessarily thickened in addition to a relatively simple rib construction for reinforcing the bottle body and also to provide a process for producing the toner bottle, a toner container comprising the toner bottle and a cap, a toner cartridge comprising the toner container filled with a toner, an image forming apparatus equipped with the toner cartridge, and an image forming process.

These objects are achieved by the present invention.

In accordance with the present invention, a toner bottle is provided that comprises a cylindrical bottle having a bottom, a cylindrical aperture for supplying a toner, and a ring gear, wherein a helical concave is formed on the side wall of the cylindrical bottle along the axis of the cylindrical bottle, the cylindrical aperture is disposed at one end of the cylindrical bottle, the cylindrical aperture is concentric with the cylindrical bottle, and the outside diameter of the cylindrical aperture is smaller than the outside diameter of the cylindrical bottle, and the ring gear is disposed on the cylindrical aperture, the ring gear is concentric with the cylindrical aperture, and the tip circle diameter of the ring gear is smaller than the outside diameter of the cylindrical bottle.

In the toner bottle according to the present invention, the teeth of the ring gear do not project beyond the outer surface of the cylindrical bottle; therefore, there is little possibility to damage the teeth due to processing such as handling, packaging, and transporting. Accordingly, the inventive toner bottle can be packaged and transported substantially without cushioning materials.

In addition, typically the inventive toner bottle is filled with a toner and is installed with a cap to produce a toner cartridge. When the toner cartridge is mounted to a developing unit of image forming apparatuses, a tight contact of the cylindrical aperture of toner bottle with the sealing member of the cap may lead to a sufficient sealed condition of the cylindrical aperture along with a sufficient supported condition of the toner cartridge; thereby leakage or escape of the toner may be prevented at the toner supplying mechanism. Consequently, the supporting condition of the cylindrical aperture may be stabilized still more, and the ring gear disposed at the cylindrical aperture may maintain the rotating rate stably. Namely, the ring gear disposed at the stable site may result in higher rotating accuracy of the toner bottle.

Further, the toner bottle may be supported more certainly since the ring gear is protected at least in a part by the outer surface of the cylindrical bottle that has an outside diameter larger than the tip circle diameter of the ring gear.

Preferably, the ring gear is disposed with a space of 5 mm to 20 mm from the end face of the cylindrical aperture.

Preferably, the difference between the outer diameter of the cylindrical bottle and the tip circle diameter of the ring gear is 1 mm to 10 mm.

Preferably, the toner bottle further comprises a connecting and extending portion at one end of the cylindrical bottle, wherein the inner diameter of the cylindrical aperture of the connecting and extending portion is smaller than the inner diameter of the cylindrical bottle, a spiral path for guiding the toner is provided on the connecting and extending portion, and the ring gear is connected to the edge of the connecting and extending portion.

These features may lead to smooth and rapid feeding of the toner, and may afford the toner bottle with less weight and higher strength.

Preferably, the tooth width of the ring gear is 2 mm or more, in particular the tooth width of the ring gear is 4 mm to 6 mm.

These features may lead to higher mechanical strength of the ring gear, more stable engagement of the ring gear with a driving gear, thus more accurate rotating rate of the ring gear. For example, plastic gears such as of PET may provide sufficient mechanical strength when these features are given.

Preferably, the ring gear is provided at the cylindrical aperture of which the wall thickness is thinner than the tooth width of the ring gear, the ring gear is comprised of a disk that is concentric with the cylindrical aperture and ring teeth that are concentrically connected to the outer edge of the disk, and the wall thickness W3 of the disk and the wall thickness W2 of cylindrical aperture are in the relation: W3=W2±2 mm.

More preferably, the wall thickness W3 of the disk and the wall thickness W2 of cylindrical aperture are 1 mm to 4 mm respectively.

The feature that wall thicknesses of the disk and the cylindrical aperture are substantially the same may prevent shrink marks in injection molding of plastic materials, thus the dimensional accuracy of the gear teeth may be enhanced.

Preferably, an aperture for feeding the toner is formed at the bottom of the cylindrical bottle, a sealing member of which the shape is sheet-like or plate-like is adhered to the aperture for feeding the toner, and the sealing member is capable of opening and closing the aperture for feeding the toner.

This feature may provide conveniences or simplicities in bottle cleaning or toner refilling, thus easy recycle of toner bottles may be afforded, and the reuse may be assured.

Preferably, the toner bottle is a molded plastic that is equipped with a ring gear molded integrally with the cylindrical bottle, and the plastic is selected from the group consisting of polyethylene terephthalate resins, polyethylene resins, polypropylene resins, polyvinyl chloride resins, polyamide resins, polystyrene resins, and polycarbonate resins.

These features may eliminate to assemble manually the ring gear and the cylindrical bottle, and also may remove possible turbulences due to manual processing, thereby contributing to higher dimensional accuracy of toner bottles.

In another aspect of the present invention, a process for producing the toner bottles described above is provided. The process according to the present invention comprises setting a hollow cylindrical preform, having a ring gear for rotating the toner bottle, into a mold tool using the ring gear as a supporting ring, heating the mold tool containing the hollow cylindrical preform, injecting pressurized gas into the hallow cavity of the hollow cylindrical preform, and thereby subjecting the hollow cylindrical preform to biaxial stretching and blow molding.

Preferably, the hollow cylindrical preform is formed by injection molding.

In the producing process, toner bottles described above may be produced as an integrally molded plastic product comprising a ring gear and a cylindrical bottle.

In another aspect of the present invention, a toner container may be provided; the toner container according to the present invention comprises a toner bottle selected from those described above and a cap, wherein the cap, being attached to the toner bottle, covers the cylindrical aperture and its neighborhood while exposing the teeth of the ring gear.

Preferably, a toner exit is provided at a site of the cap where the cap covers the cylindrical aperture, and a shutter is provided for opening and closing the toner exit.

Preferably, the toner container is mounted to an image forming apparatus in an attachable and detachable manner through the cap in a specific position, and the shutter is capable of opening.

In another aspect of the present invention, a toner cartridge may be provided; the toner cartridge according to the present invention comprises the toner container described above a toner filled in the toner container.

In the toner cartridge, leakage or dispersal of the toner may be prevented during the usage for electrophotographic image forming apparatuses, thus conveniences and/or availabilities may be provided for operators, for example.

In another aspect of the present invention, an image forming apparatus may be provided; the image forming apparatus according to the present invention comprises a photoconductor, a latent electrostatic image forming unit configured to form an electrostatic image on the photoconductor, a developing unit configured to develop the latent electrostatic image by means of a toner to form a visible image, a transferring unit configured to transfer the visible image on a recording medium, and a fixing unit configured to fix the transferred image on the recording medium, wherein the toner cartridge described above is mounted to the image forming apparatus through the cap in an attachable and detachable manner, and the toner is supplied from the toner cartridge.

In the image forming apparatus, the improved accuracy for rotating the toner bottle may bring about more stable feeding of the toner into the developer. Further, the enhanced mechanical strength of the gear for rotating the toner bottle may avoid the disadvantage that the toner cartridge should be discarded before all of the toner filled initially is consumed due to an accidental damage of gears.

In another aspect of the present invention, an image forming process may be provided; the image forming process comprises forming a latent electrostatic image on a photoconductor surface, developing the latent electrostatic image to form a visible image by means of a toner, transferring the visible image on a recording medium, and fixing the image transferred on the recording medium, wherein the image forming apparatus is employed to which the toner cartridge is mounted through the cap in an attachable and detachable manner, and the toner is supplied from the toner cartridge.

In the image forming process, the improved accuracy for rotating the toner bottle may bring about more stable feeding of the toner into the developer. Further, the enhanced mechanical strength of the gear for rotating the toner bottle may avoid the disadvantage that the toner cartridge should be discarded before all of the toner filled initially is consumed due to an accidental damage of gears.

DESCRIPTION OF THE PREFERRED EMBODIMENTS

The present invention will be explained in detail with reference to figures.

<First Mode>

Figure 1:
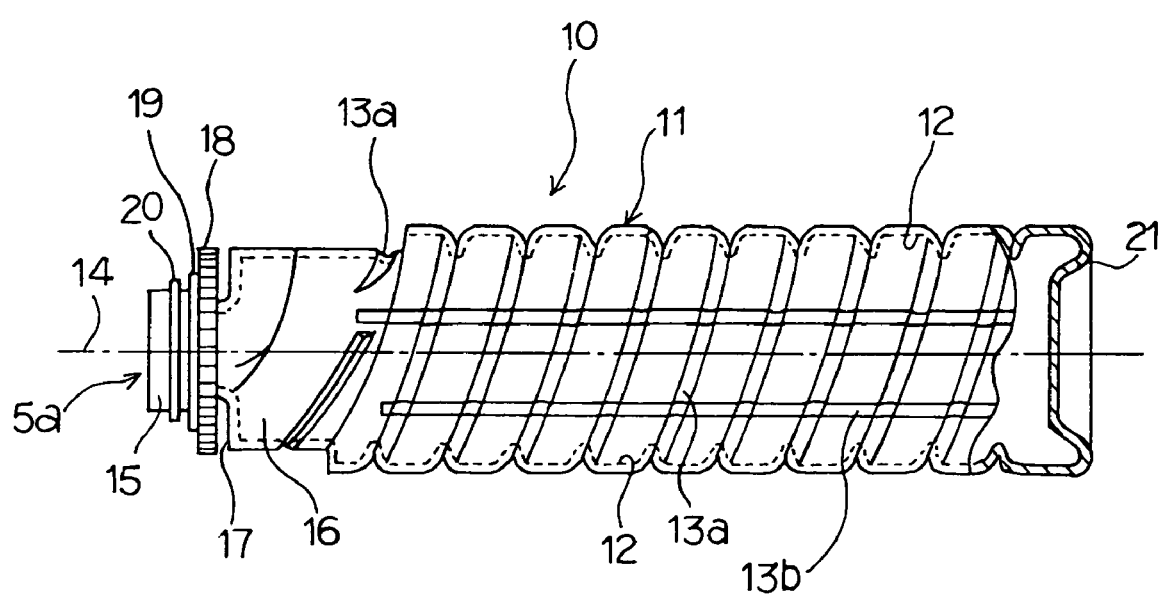
FIG. 1 is a partially cross-sectional front view showing exemplarily an entire construction of a toner bottle of the first mode according to the present invention in a condition that the cap is removed.

FIG. 1 is a partially cross-sectional front view showing the entire construction of toner bottle 10 of a molded product, in which a cap is removed. A toner container is constructed by attaching a cap (not shown) to cylindrical aperture 15 of toner bottle 10. On the side wall of cylindrical bottle 11 of toner bottle 10, helical concave 12 and reinforcing helical rib 13a are formed along the axis 14, and linear rib 13b is formed in parallel with the axis 14. The cylindrical bottle 11 has a bottom.

Cylindrical aperture 15 for supplying a toner is provided at one axial end of cylindrical bottle 11, the cylindrical aperture 15 is concentric with cylindrical bottle 11. Cylindrical aperture 15 has a certain length and serves as an inlet for supplying the toner into a developing portion (not shown) of an image forming apparatus, and the end of cylindrical aperture 15 corresponds to toner supplying inlet 5a. Ring gear 18 or flange-like gear concentric with cylindrical bottle 11 is provided on cylindrical aperture 15. In addition, connecting and extending portion 16 and shoulder 17 that are concentric with cylindrical bottle 11 are provided between the front edge of cylindrical bottle 11 and cylindrical aperture 15.

Toner bottle 10 has structural features in that ring gear 18 of which the tip circle diameter is smaller than the outer diameter of the cylindrical bottle 11 to which helical concave 12 is formed, and the ring gear serves to rotate the toner container as a driven gear and is disposed concentrically with cylindrical aperture 14; ring gear 18 is provided on cylindrical aperture 15; the width of teeth portion of ring gear, i.e. tooth width, is 2 mm or more; and connecting and extending portion 16 is provided that has a specific construction.

The connecting and extending portion 16, being connected to the front edge of cylindrical bottle 11 opposite to bottom 21, is a way to direct the toner. The connecting and extending portion 16 tapers down from the side of cylindrical bottle 11 to the side of cylindrical aperture 15. Ring gear 18 may exist anywhere of cylindrical aperture 15; FIG. 1 shows a mode in which ring gear 18 is situated in connection with the edge of connecting and extending portion 16.

In FIG. 1, reference numbers 19 and 20 are members for engaging and mounting a cap (not shown) to cylindrical aperture 15 of cylindrical bottle 11; reference number 19 is a ring butt to attach the cap in a sealed manner; reference number 20 is a ring collar for preventing detachment of the cap. An instrument of a cap with a shutter leads to easy packaging and transporting without cushioning materials as described earlier.

Cylindrical bottle 11 of such construction can be produced by biaxial stretching blow molding as described later.

The toner container (not shown) formed of cylindrical bottle 11 and the cap (not shown) may be mounted in an attachable and detachable manner in developing parts of image forming apparatuses with axis 14 in approximately horizontal direction. Then, rotating the toner container around axis 14 by rotating the driving gear, while engaging ring gear 18 with the driving gear, may lead to guide and transport the toner contained in cylindrical bottle 11 by spiral concave 12, thereby supplying the toner to the developing part through cylindrical aperture 15.

In the constructions of the toner bottle and the toner container, the teeth of the ring gear do not project beyond the outer surface of the cylindrical bottle; therefore, there is little possibility to damage the teeth due to processing such as handling, packaging, and transporting. Preferably, the toner bottle for example shown in FIG. 1 is equipped with a toner feeding aperture (not shown) at bottom 21 of the toner body, and a sheet-like or plate-like sealing member in an attachable and detachable manner that enables to open and close the toner feeding aperture, which enables to assure recycle of the toner bottles.

Preferably, the toner bottle 10 for example shown in FIG. 1 and the cap (not shown) enable the attachment of the resulting toner container; wherein when the cap is attached to the toner bottle, the cap covers the cylindrical aperture 15 and its neighborhood, while exposing the teeth of ring gear 18. In addition, it is preferable that a shutter is provided at a site of the cap where the cap covers the cylindrical aperture such that the shutter opens when the toner container is mounted to electrophotographic image forming apparatuses in a specific position.

Further, filling a toner to the toner container according to the present invention may provide a toner cartridge according to the present invention; then the toner cartridge may be attached to electrophotographic image forming apparatuses by making use of a cap.

<Second Mode>

Figure 2:
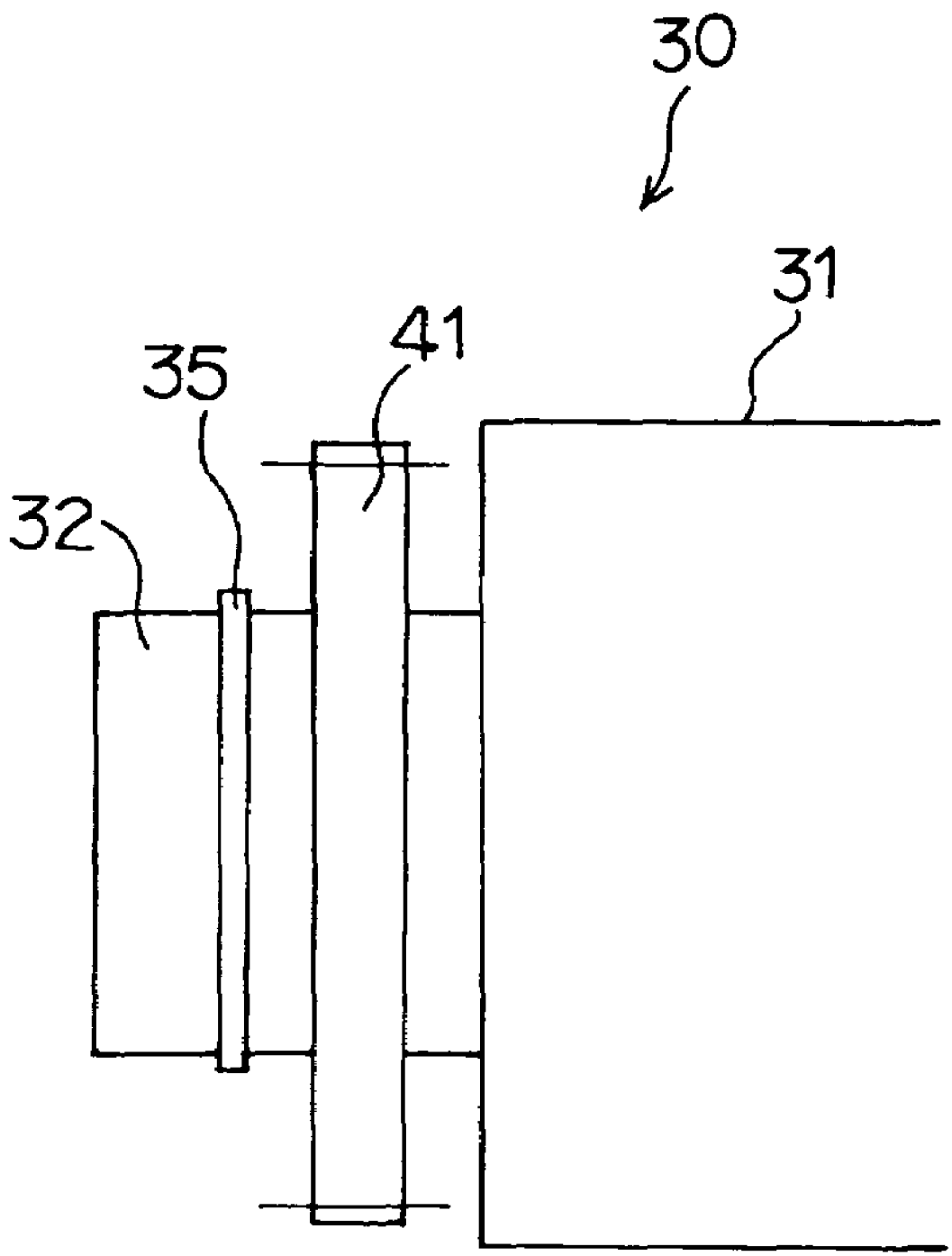
FIG. 2 is a front view showing exemplarily a representative construction of a toner bottle of the second mode according to the present invention.
Figure 3A:
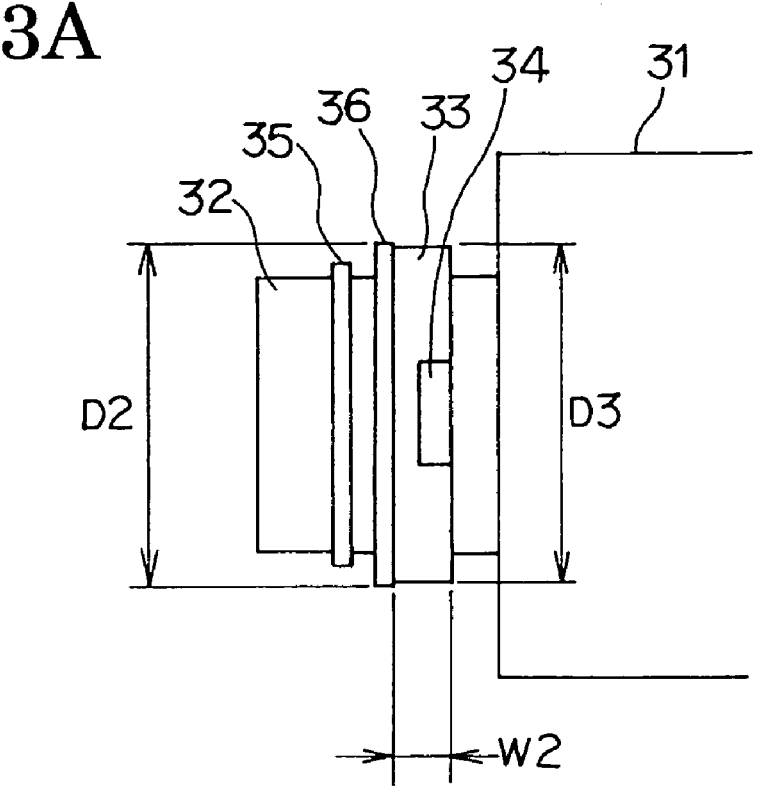
FIG. 3A is a front view showing exemplarily a representative construction of a cylindrical bottle of the second mode according to the present invention.
Figure 3B:
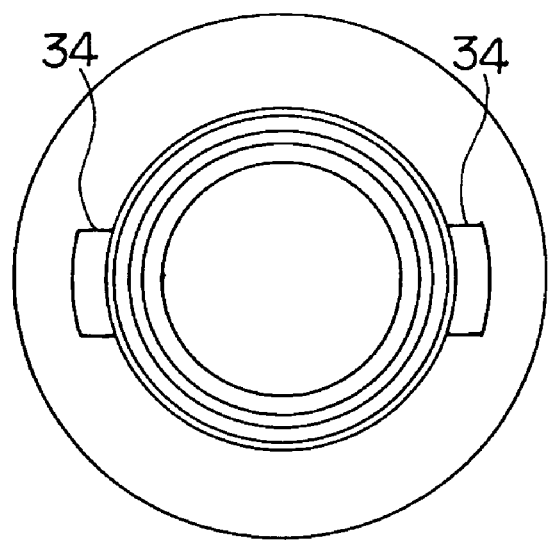
FIG. 3B is a side view of the representative construction of the cylindrical bottle shown in FIG. 3A.
Figure 4A:
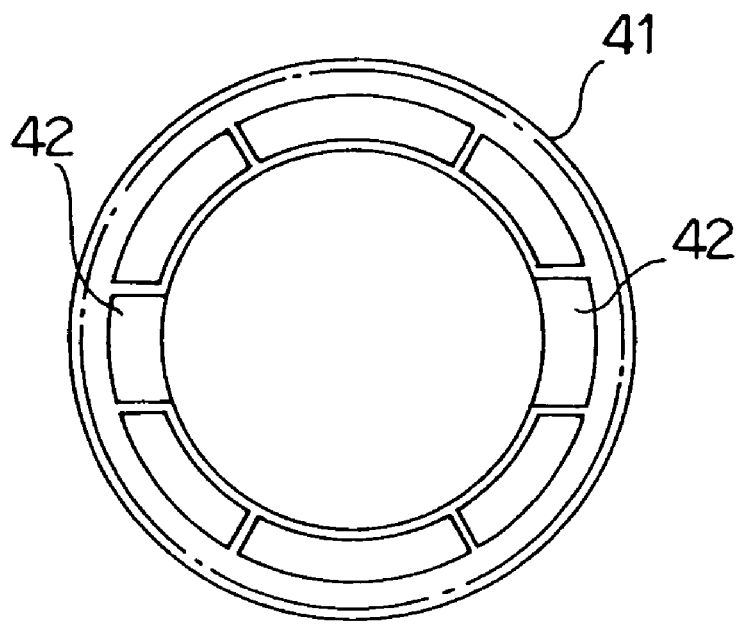
FIG. 4A is a front view showing exemplarily a ring gear construction of a toner bottle of the second mode according to the present invention.
Figure 4B:
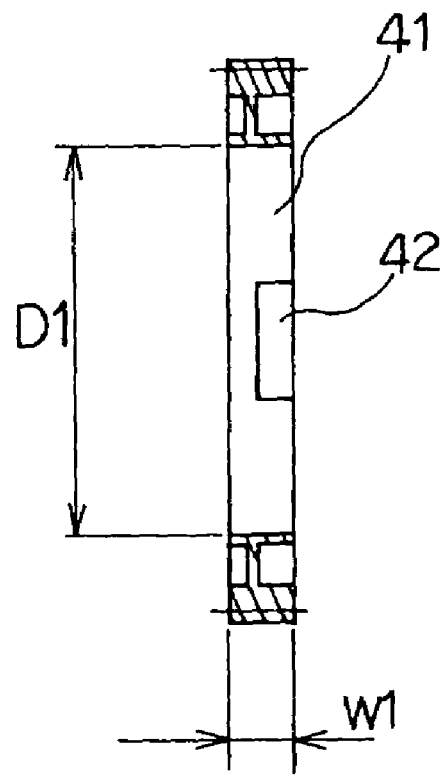
FIG. 4B is a side view showing exemplarily the ring gear construction of the toner bottle shown in FIG. 4A.

FIG. 2 shows a front view of a cylindrical aperture and its neighborhood of a toner bottle that is formed by engaging a plastic ring gear to a plastic cylindrical bottle. FIG. 3A shows a front view of a representative construction of a cylindrical bottle prior to engaging a ring gear; FIG. 3B is the side view. FIG. 4A is a front view showing the construction of the ring gear; FIG. 4B is the cross section.

The toner bottle 30 shown in FIG. 2, of which the essential construction is substantially the same as that shown in FIG. 1, is constructed by engaging a plastic ring gear 41, which has a literally ring shape, to plastic cylindrical bottle 31 shown in FIGS. 3A and 3B. Specifically, cylindrical aperture 32 for supplying toner is provided at a front portion of cylindrical bottle 31 shown in FIGS. 3A and 3B; flange 33 is provided between the cylindrical aperture and cylindrical bottle 31; and a pair of projections 34 opposing each other are formed on the outer surface of flange 33. In addition, ring collar 35 is formed on cylindrical aperture 32; ring projection 36 for preventing detachment of the gear is formed at the front edge of flange 33. Ring collar 35 corresponds to ring collar 20 for preventing detachment of the cap shown in FIG. 1; ring projection 36 performs also as a ring butt joint to attach the cap (not shown) in a sealed condition. On the other hand, concaves 42 corresponding to convexes 34 are formed on ring gear 41 as shown in FIGS. 4A and 4B.

As for the sizes of the respective parts, for example, the inner diameter D1 of ring gear 41 is 34.2 mm; outer diameter D2 of ring projection 36 is 34 mm; outer diameter D3 of flange 33 is 34.1 mm; tooth width W1 of ring gear 41 is 5.5 mm; and width W2 of flange 33 is 6 mm.

When toner bottle 30 shown in FIG. 2 is constructed, ring gear 41 is inserted into the toner bottle 30 of the side of feeding aperture 32, then is passed through ring collar 35 and ring projection 36, and is inserted into and fitted with flange 33. In the construction, concaves 42 are fitted with projections 34.

<Third Mode>

Figure 5:
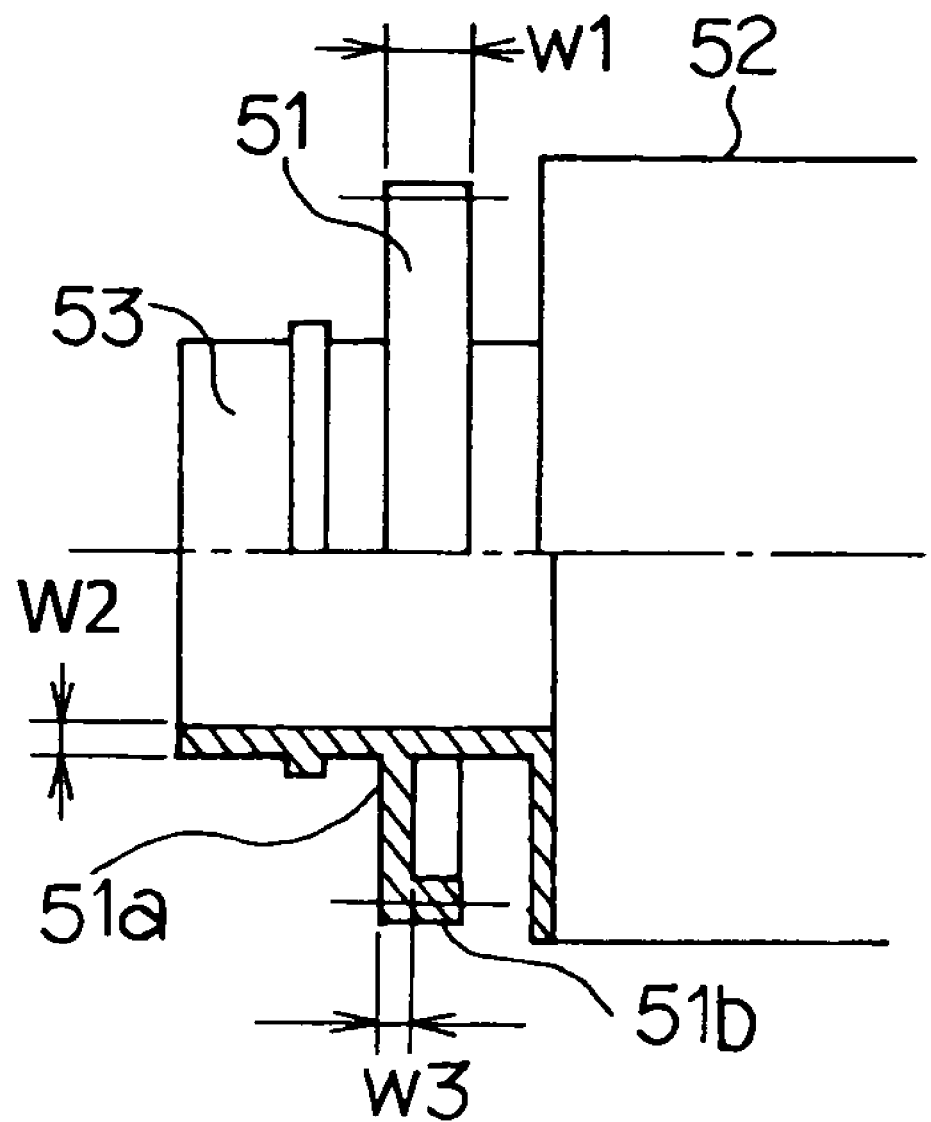
FIG. 5 is a cross-section view showing exemplarily a representative construction of a toner bottle of the third mode according to the present invention.

FIG. 5 is a partial cross section showing essential construction of a toner bottle. The toner bottle 50, being a plastic molded product, has substantially the same construction as that shown FIG. 1, wherein ring gear 51 is formed integrally with cylindrical bottle 52.

Toner bottle 50, wherein ring gear 51 being provided concentrically with cylindrical aperture 53, has features that wall thickness W3 of cylindrical aperture 53 is smaller than tooth width W1 of ring gear teeth is 51b (e.g. W1: 5.5 mm, W3: 2 mm), the ring gear 51 is comprised of a disk 51a that is concentric with cylindrical aperture 53 and ring teeth 51b that are connected concentrically with the outer edge of the disk 51a, and the wall thickness W3 of disk 51a is substantially the same as the wall thickness W2 of cylindrical aperture 53.

(Process for Producing Toner Bottle)

The inventive process for producing a toner bottle can produce toner bottles according to the present invention. The inventive process comprises preform setting, blow molding, and the other processing depending on requirements.

In the preform setting, a hollow cylindrical preform that is provided with a ring gear for rotating the toner bottle is set in a mold tool using the ring gear as a supporting ring, wherein the ring gear is set concentrically with a cylindrical aperture for supporting a toner. Preferably, the preform is produced by an injection molding process.

In the blow molding, the preform is heated; then pressurized gas is injected into the hallow cavity of the preform and the preform is subjected to biaxial stretching and blow molding.

The conditions in the biaxial stretching and blow molding such as pressure of the pressurized gas and temperature of the heated mold tool may be properly selected depending on the molded material, intended shape, and the like; for example, the pressure of the pressurized gas may be 0.5 to 10 MPa, the temperature of the heated preform may be 90 to 120° C. in the case of polyethylene terephthalate (PET) resin.

Figure 6:
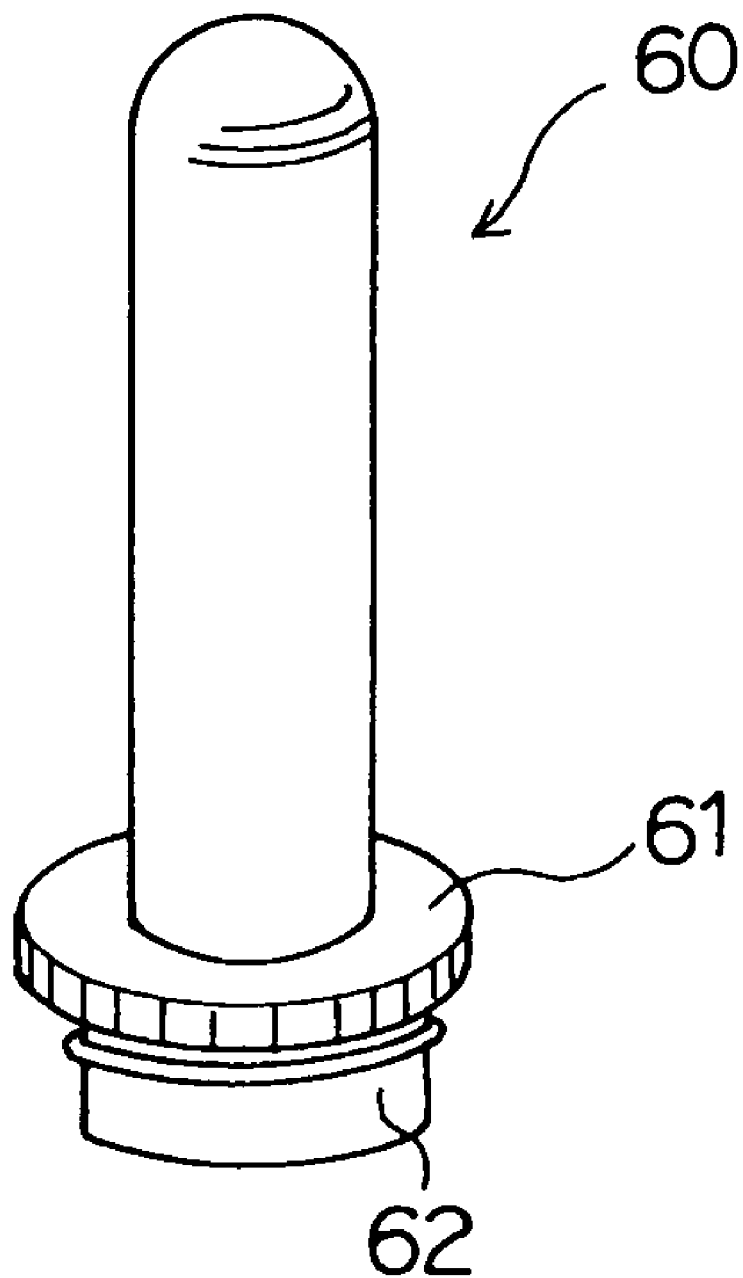
FIG. 6 is a schematic perspective view showing exemplarily a preform shape for producing the toner bottle according to the present invention by biaxial stretching and blow molding.

Toner bottle 50 having integrally a ring gear as shown in FIG. 5 may be produced by injection molding a preform or parison 60 as shown in FIG. 6 for example, setting the preform or parison 60 into a mold tool having a predetermined configuration, and subjecting to a biaxial stretching and blow molding. The preform or parison 60 may be produced from a PET resin or a mixture of PET and a polyethylene resin.

Figure 7:
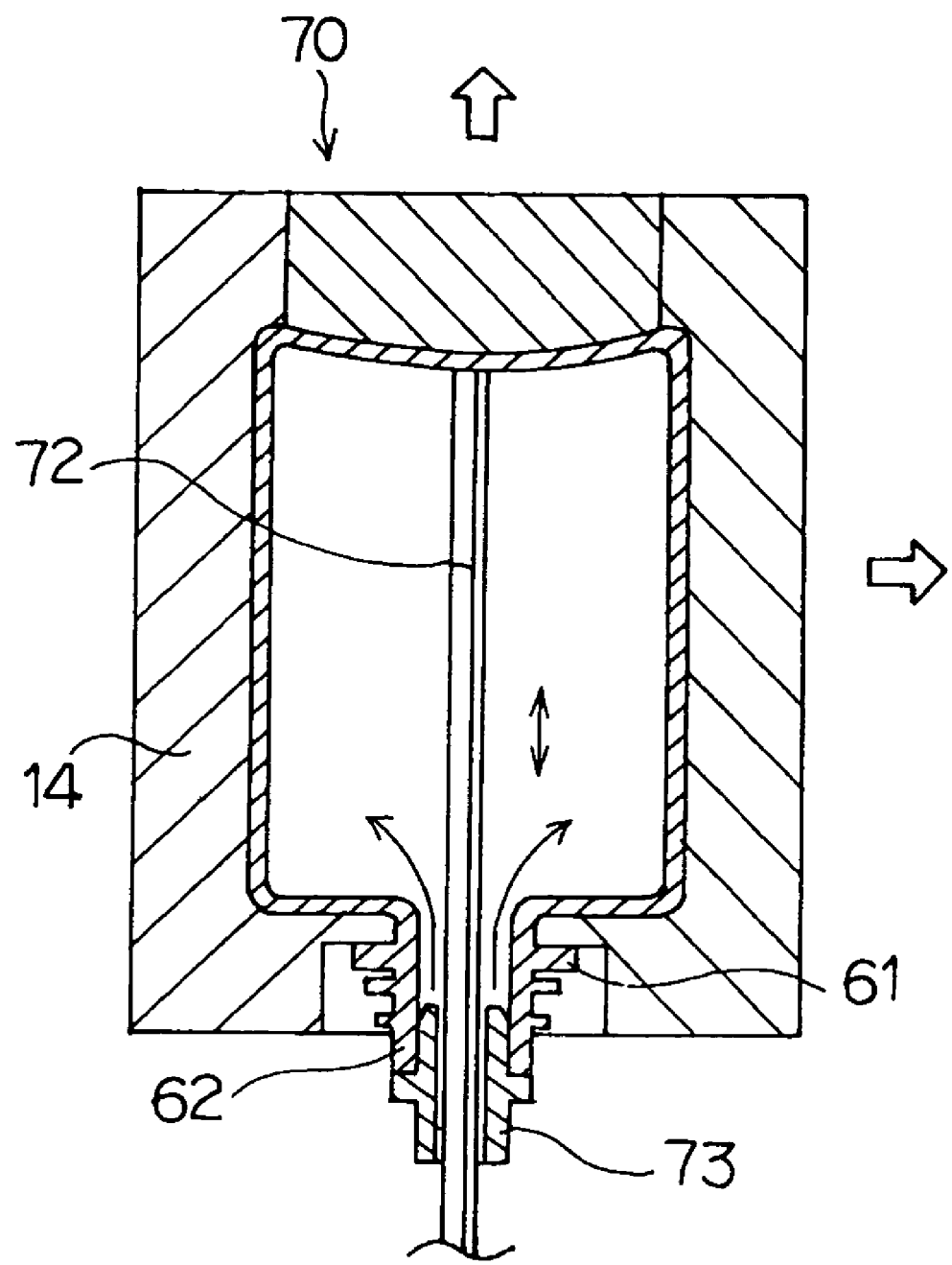
FIG. 7 shows a way that the preform shown in FIG. 6 is subjected to biaxial stretching and blow molding to prepare a toner bottle.
Figure 8:
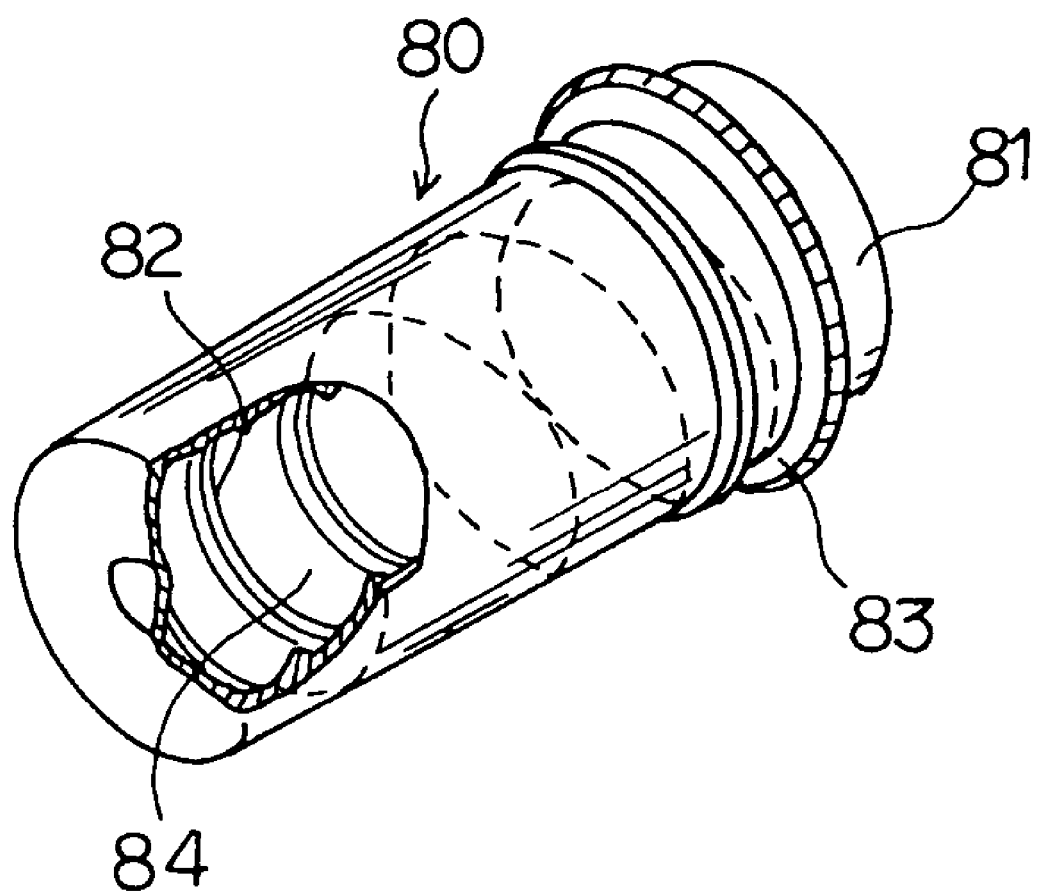
FIG. 8 is a schematic perspective view that shows exemplarily a container for supplying a developer in the prior art.
Figure 9:
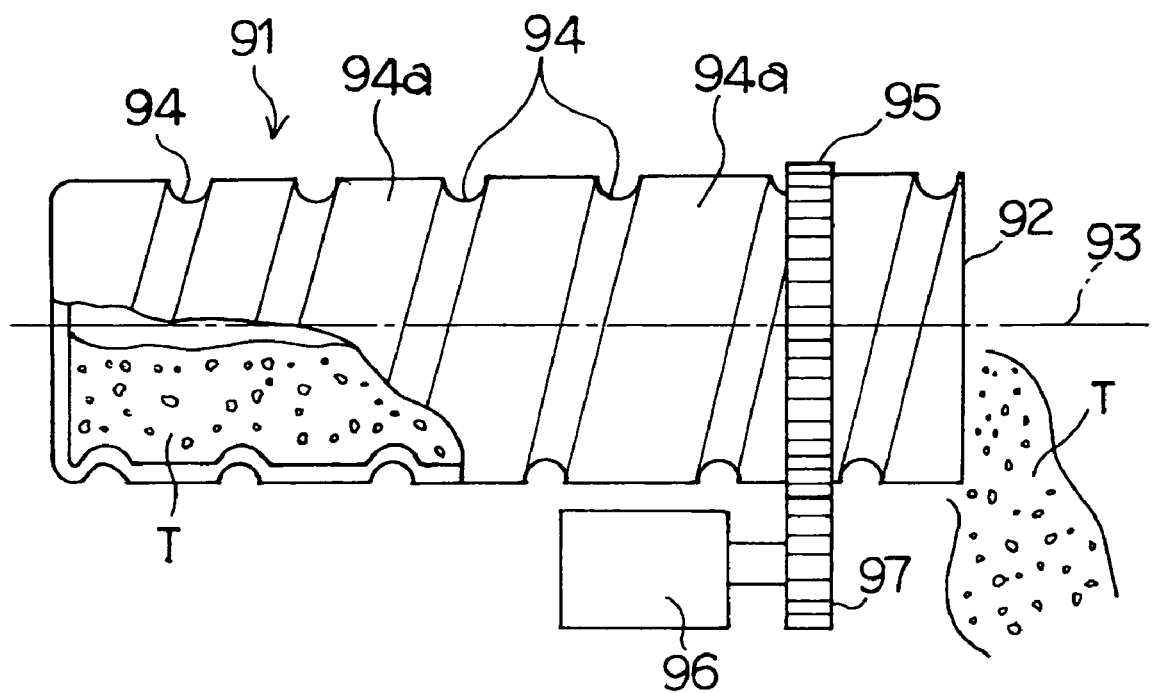
FIG. 9 is a schematic perspective view that shows exemplarily another container for supplying a developer in the prior art.

Specifically, hollow cylindrical preform 60 is produced by an injection molding process in a shape that ring gear 61 for rotating the toner bottle is provided concentrically with cylindrical aperture 62 for supplying a toner, then the preform 60 is set in molding tool 70 by making use of the ring gear 61 as a support ring; and the molding tool 70 is heated and pressurized gas is blown into the hallow cavity of the preform 70, thus an intended toner bottle may be obtained through a biaxial stretching and blow molding. In FIG. 7, reference number 72 is a stretch pin, 73 is a carrier pin.

(Toner Container and Toner Cartridge)

The inventive toner container comprises the inventive toner bottle, a cap, shutter, and the other parts depending on the requirements. The cap covers the cylindrical aperture 15 and its neighborhood, when the cap is attached to the toner bottle. The material of the cap may be properly selected depending on the application; for example, such thermoplastics are available as polystyrene resins, polyvinyl chloride resins, polyethylene resins, polyethylene terephthalate resins, polypropylene resins, polyoxymethylene resins, ABS resins, and polycarbonate resins.

Preferably, a toner exit and a shutter to open and close the toner exit are provided at a site of the cap where the cap covers the cylindrical aperture such that the shutter opens or closes the toner exit. Further, it is preferable that the toner container is mounted to image forming apparatuses with the cap in an attachable and detachable manner, and the shutter can be opened in a specific manner.

Filling a toner into toner containers according to the present invention may provide toner cartridges according to the present invention. The toner may be properly selected from commercially available toners.

(Image Forming Apparatus and Image Forming Process)

The image forming apparatus according to the present invention comprises a latent electrostatic image bearing member, latent electrostatic image forming unit, developing unit, transferring unit and fixing unit, and may further comprise an attaching-detaching mechanism of inner cap and the other units, for example, charge-eliminating unit, cleaning unit, recycling unit and control unit, if required.

The image forming process according to the present invention comprises a latent electrostatic image forming step, developing step, transferring step and fixing step, and may further comprise the other steps, for example, a charge-eliminating step, cleaning step, recycling step and control step, if required.

The toner cartridge according to the present invention is mounted to image forming apparatuses in an attachable and detachable manner, and is constructed such that a toner is supplied into the developing unit through rotating the toner cartridge.

The image forming process according to the present invention may be suitably applied to the image forming apparatus according to the present invention. The latent electrostatic image forming step may be performed by the latent electrostatic image forming unit, the developing step may be performed by the developing unit, the transferring step may be performed by the transferring unit, and the fixing step may be performed by the fixing unit. The other unit may perform the other steps.

—Latent Electrostatic Image Forming Step and Latent Electrostatic Image Forming Step—

The latent electrostatic image forming step is one that forms a latent electrostatic image on the latent electrostatic image bearing member.

The latent electrostatic image bearing member (hereinafter referred to as "photoconductor") is not particularly limited as to the material, shape, construction or size, and may be suitably selected from those known in the art. For example, its shape may be drum-like, and its material may be that of an inorganic photoconductor, such as amorphous silicon or selenium, or an organic photoconductor such as polysilane or phthalocyanine. Among these, amorphous silicon is preferred from the viewpoint of long life.

The latent electrostatic image may be formed, for example, by uniformly charging the surface of the latent electrostatic image bearing member, and irradiating it imagewise, which may be performed by the latent electrostatic image forming unit.

The latent electrostatic image forming unit, for example, comprises a charger which uniformly charges the surface of the latent electrostatic image bearing member, and a light irradiator which exposes the surface of the latent image carrier imagewise.

The charging may be performed, for example, by applying a voltage to the surface of the latent electrostatic image bearing member using the charger.

The charger is not particularly limited and may be suitably selected depending on the application, for example, contact chargers known in the art such as a conductive or semiconductive roller, brush, film or rubber blade, and non-contact chargers using corona discharge such as corotron and scorotron are exemplified.

As for the charging member, the shape thereof is not specifically limited and may for example be, apart from a roller, a magnetic brush or a fur brush. It can be suitably selected according to a specification or configuration of an image-forming apparatus. When a magnetic brush is employed as the charger, the magnetic brush contains an electrostatic charger formed of various ferrite particles such as Zn—Cu ferrite, a non-magnetic conductive sleeve to support the electrostatic charger, and a magnetic roller contained in the non-magnetic conductive sleeve. When a fur brush is used as a charger, a material of the fur brush is, for example, a fur that becomes conductive by treatment with, for example, carbon, copper sulfide, a metal or a metal oxide, and the fur is coiled or mounted to a metal or another core rod which becomes conductive by treatment.

The light irradiation may be performed by irradiating the surface of the latent electrostatic image bearing member imagewise, using the light irradiator for example.

The light irradiator is not particularly limited and may be suitably selected depending on the application, provided that it may expose the surface of the latent electrostatic image bearing member charged by the charger in the same way as the image to be formed, for example, a light irradiator such as copy optical system, rod lens array system, laser optical system and liquid crystal shutter optical system may be exemplified.

In addition, in the present invention, a backlight system may be employed wherein the latent electrostatic image bearing member is exposed imagewise from its rear surface.

(Developing Process and Developing Unit)

The developing step is one that develops a latent electrostatic image using the toner supplied from the toner cartridge according to the present invention to form a visible image.

The visible image may be formed for example by developing the latent electrostatic image using the toner or developer, which may be performed by the developing unit.

The developing unit is not particularly limited provided that it may develop an image for example by using the toner or developer, and may be suitably selected from among those known in the art. Examples are those which comprise an image-developer housing the toner, and which may supply the toner with contact or without contact to the latent electrostatic image.

In the image-developer, the toner and the carrier may for example be mixed and stirred together. The toner is thereby charged by friction, and forms a magnetic brush on the surface of the rotating magnet roller. Since this magnet roller is arranged near the photoconductor, part of the toner in the magnetic brush formed on the surface of this magnet roller moves to the surface of this photoconductor due to the force of electrical attraction. As a result, the latent electrostatic image is developed by this toner, and a visible toner image is formed on the surface of this photoconductor.

—Transferring Step and Transferring Unit—

The transferring step is one that transfers the visible image to a recording medium. In a preferred mode, the first transferring is performed wherein, using an intermediate image-transfer member, the visible image is transferred to the intermediate image-transfer member, and the second transferring is then performed wherein this visible image is transferred to a recording medium. In a more preferred mode, using toner of two or more colors and preferably full color toner, the primary transferring step transfers the visible image to the intermediate image-transfer member to form a compounded transfer image, and the second transferring step transfers this compounded transfer image to the recording medium.

The transferring can be realized, for example, by charging the photoconductor using a transferring charger, which can be performed by the transferring unit. In a preferred mode, the transferring unit comprises a first transferring unit which transfers the visible image to the intermediate image-transfer member to form a compound transfer image, and a second transferring unit which transfers this compounded transfer image to the recording medium.

The intermediate image-transfer member is not particularly limited and may be suitably selected from transfer bodies known in the art; for example, a transfer belt may be exemplified.

The transferring unit of the first transferring unit and the second transferring unit preferably comprises an image-transferer which charges by releasing the visible image formed on the latent electrostatic image bearing member or photoconductor to the recording-medium side. There may be one, two or more of the transferring unit.

The image-transferer may be a corona transferring unit which functions by corona discharge, a transferring belt, a transferring roller, a pressure transferring roller or an adhesion transferring unit.

The recording medium is not particularly limited and may be suitably selected from among recording media or recording papers known in the art.

The recording medium is typically plain paper, but is not specifically limited, may be selected depending on the application and includes, for example, a polyethylene terephthalate (PET) base for overhead projector (OHP).

The fixing step is one that fixes the visible image transferred to the recording medium using a fixing apparatus. This may be carried out for developer of each color transferred to the recording medium, or in one operation when the developers of each color have been laminated.

The fixing apparatus is not particularly limited and may be suitably selected from heat and pressure unit known in the art. Examples of heat and pressure unit include a combination of a heat roller and pressure roller, and a combination of a heat roller, pressure roller and endless belt.

The heating temperature in the heat-pressure unit is preferably 80° C. to 200° C. Also, in the present invention, an optical fixing unit known in the art may be used in addition to or instead of the fixing step and fixing unit, depending on the application.

The charge-eliminating step is one that applies a discharge bias to the latent electrostatic image bearing member to discharge it, which may be performed by a charge-eliminating unit.

The charge-eliminating unit is not particularly limited and may be suitably selected from charge-eliminating unit known in the art provided that it can apply a discharge bias to the latent electrostatic image bearing member; for example, a discharge lamp.

The cleaning step is one that removes electrophotographic toner remaining on the latent electrostatic image bearing member, and may be performed by a cleaning unit.

The cleaning unit is not particularly limited and may be suitably selected from cleaning unit known in the art provided that it can remove electrophotographic toner remaining on the latent electrostatic image bearing member, for example, a magnetic brush cleaner, electrostatic brush cleaner, magnetic roller cleaner, blade cleaner, brush cleaner and web cleaner are exemplified.

The recycling step is one that recycles the electrophotographic toner removed by the cleaning step to the developing step, and may be performed by a recycling unit.

The recycling unit is not particularly limited and may be suitably selected from among transport unit known in the art.

The control step is one that controls the respective processes, and may be properly implemented by a control unit.

The control unit is not particularly limited and may be suitably selected depending on the application provided that it can control the operation of each of the unit, for example, a device such as a sequencer or a computer.

An embodiment of the image forming process of the present invention using the image forming apparatus according to the present invention will be illustrated with reference to FIG. 10. The image forming apparatus 100 shown in FIG. 10 comprises photoconductor drum 110 (hereinafter briefly referred to as "photoconductor 110") as the latent electrostatic image bearing member, charging roller 120 as the charging unit, light irradiator 30 as the exposing unit, image-developer 40 as the developing unit, intermediate image-transfer member 50, cleaner 60 serving as the cleaning unit and having a cleaning blade, and charge-eliminating lamp 70 as the charge-eliminating unit.

The intermediate image-transfer member 50 is an endless belt, being designed such that it is spanned over three rollers 51 and driven in the direction indicated by an arrow. One of the three rollers 51 serves as a bias roller for applying a bias for image transfer to the intermediate image-transfer member 50. A cleaner 90 for cleaning the intermediate image-transfer member 50 is arranged in the vicinity of the intermediate image transfer member 50 and includes a cleaning blade. A transferring roller 80 as the transferring unit faces the intermediate image-transfer member 50 and transfers a toner image from the intermediate image-transfer member 50 to a transferring sheet 95 serving as a final transferring member. A corona charger 58 for applying charges onto the developed image on the intermediate image-transfer member 50 is arranged around the intermediate image-transfer member 50. The corona charger is disposed between a contact area of the photoconductor 110 and the intermediate image-transfer member 50 and another contact area of the intermediate image-transfer member 50 and the transfer sheet 95 in the direction of rotation of the intermediate image-transfer member 50.

The image-developer 40 is comprised of a developing belt 41 as a developer carrier, black developing unit 45K disposed around the developing belt 41, yellow developing unit 45Y, magenta developing unit 45M and cyan developing unit 45C. The black developing unit 45K includes a developer tank 42K, developer feed roller 43K and developing roller 44K. The yellow developing unit 45Y includes a developer tank 42Y, developer feed roller 43Y and developing roller 44Y. The magenta developing unit 45M includes a developer tank 42M, developer feed roller 43M and developing roller 44M. The cyan developing unit 45C includes a developer tank 42C, developer feed roller 43C and developing roller 44C. The developing belt 41 is in the form of an endless belt and is spanned over plural belt rollers rotatably, a part of which is in contact with the photoconductor 110.

Figure 10:
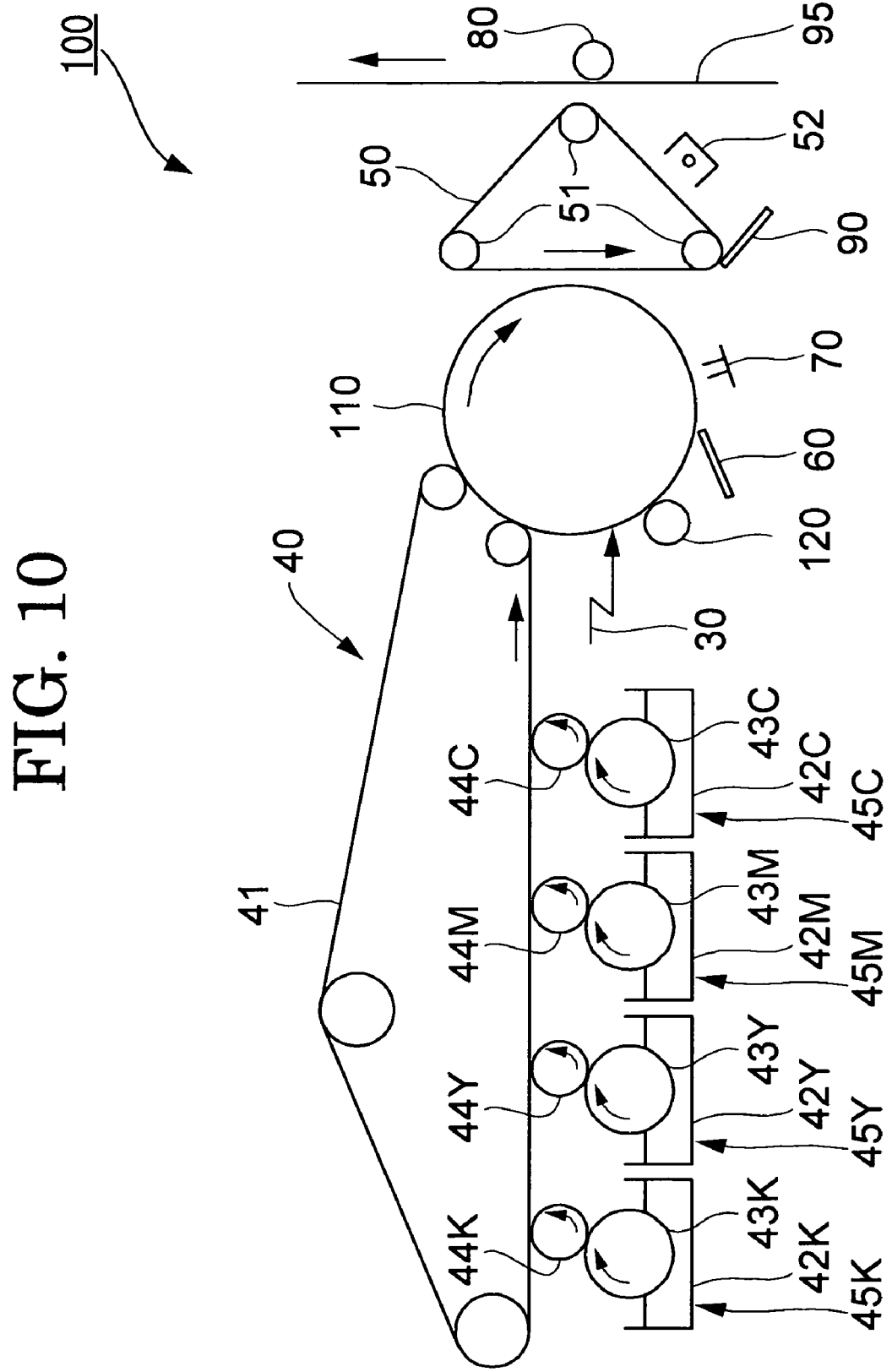
FIG. 10 is a schematic exemplary view that shows an inventive image forming process by means of an inventive image forming apparatus.

In the image forming apparatus 100 shown in FIG. 10, for example, the charging roller 120 uniformly charges the photoconductor 110. The light irradiator 30 applies light to the photoconductor 110 imagewise to form a latent electrostatic image thereon. The image-developer 40 feeds the developer to the photoconductor 110 to thereby develop the latent electrostatic image thereon to form a visible image. The visible image is transferred (primary transferring) to the intermediate image-transfer member 50 and then transferred (secondary transferring) to the transferring sheet 95 by action of a voltage applied by the rollers 51, to thereby form a transferred image on the transferring sheet 95. Untransferred developers on the photoconductor 110 after the transferring procedure are removed by the cleaner 60, followed by elimination of residual charges by the charge eliminating lamp 70 to be subjected to another charging procedure.

Figure 11:
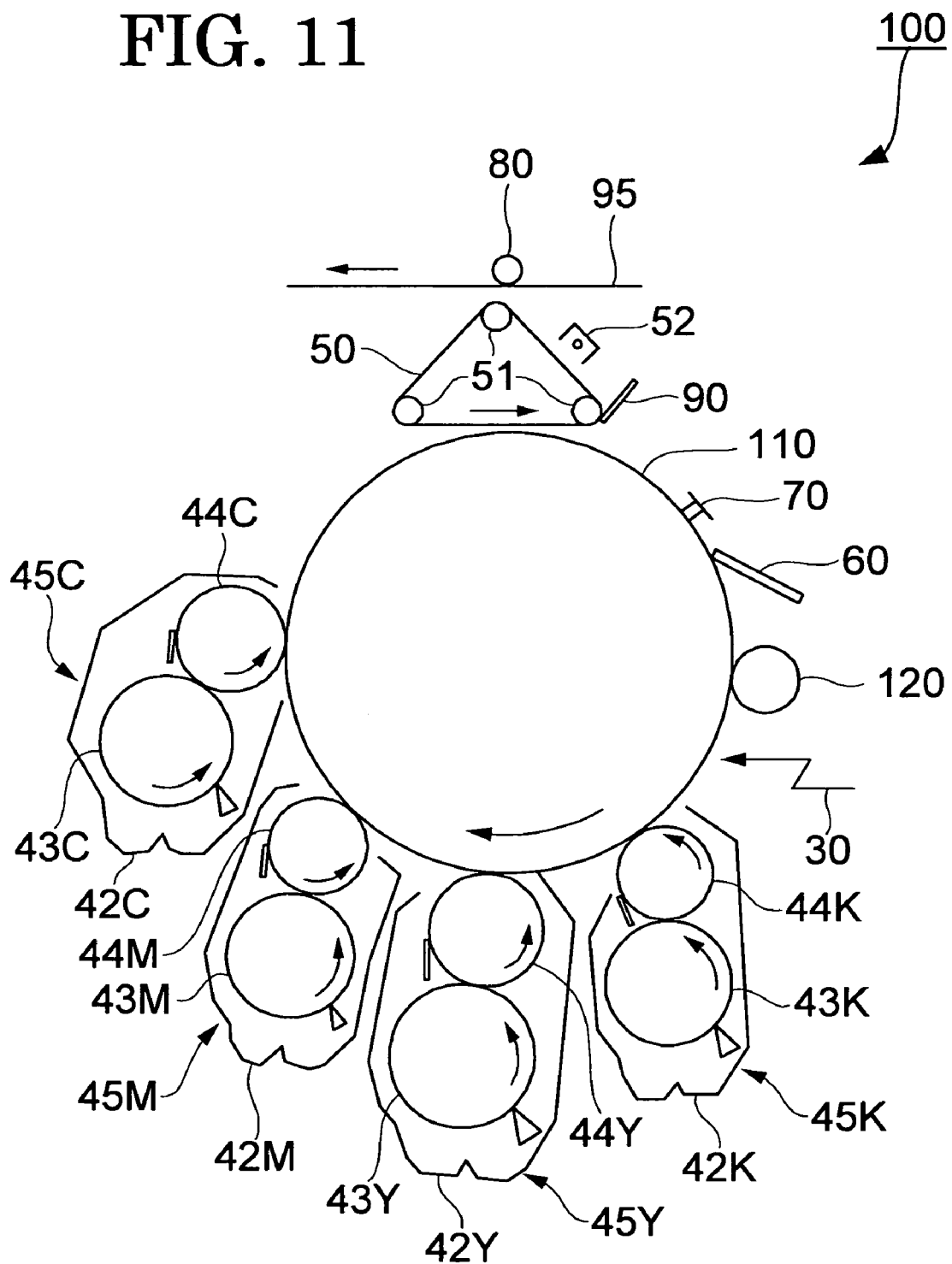
FIG. 11 is another schematic exemplary view that shows an inventive image forming process by means of an inventive image forming apparatus.

Another embodiment of the image forming process using the image forming apparatus will be illustrated with reference to FIG. 11. The image forming apparatus 100 of FIG. 11 has the same configuration and the same advantages as in the image forming apparatus 110 of FIG. 10, except that the image forming apparatus 100 of FIG. 11 does not include a developing belt 41, and that a black developing unit 45K, yellow developing unit 45Y, magenta developing unit 45M and cyan developing unit 45C surround and directly face a photoconductor 110. The same components of FIG. 11 as those of FIG. 10 have the same reference numerals, respectively.

Figure 12:
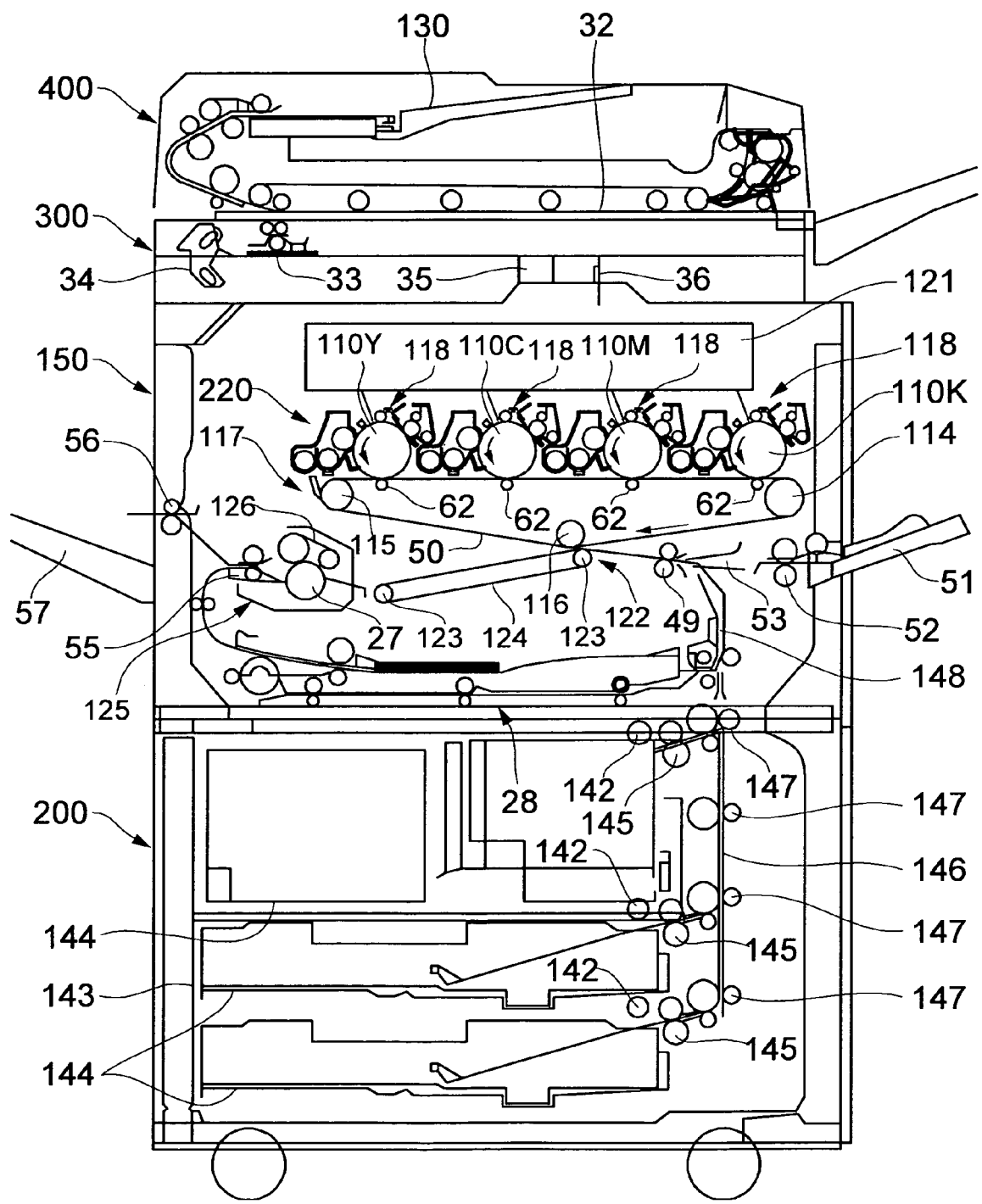
FIG. 12 is a schematic exemplary view that shows an inventive image forming process by means of an inventive image forming apparatus of tandem type color apparatus.

The image forming apparatus 100 shown in FIG. 12 is a tandem color image forming apparatus which includes a copier main body 150, feeder table 200, scanner 300 and automatic document feeder (ADF) 400.

The copier main body 150 includes an endless-belt intermediate image-transfer member 50 at its center part. The intermediate image-transfer member 50 is spanned over three support rollers 114, 115 and 116 and is capable of rotating and moving in a clockwise direction in FIG. 12. An intermediate image-transfer member cleaner 117 is arranged in the vicinity of the second support roller 115. The intermediate image-transfer member cleaner 117 is capable of removing a residual toner from the intermediate image-transfer member 50 after image transfer. Above the intermediate image-transfer member 50 spanned between the first and second support rollers 114 and 115, yellow, cyan, magenta and black image forming devices 118 are arrayed in parallel in a moving direction of the intermediate image-transfer member 50 to thereby constitute a tandem image forming unit 220. A light irradiator 121 is arranged in the vicinity of the tandem image forming unit 220. A secondary image-transferer 122 faces the tandem image-developer 220 with the interposition of the intermediate image-transfer member 50. The secondary image-transferer 122 comprises an endless belt serving as a secondary transferring belt 124 spanned over two rollers 123. The transferring sheet transported on the secondary transferring belt 124 is capable of being in contact with the intermediate image-transfer member 50. An image-fixer 125 is arranged on the side of the secondary image-transferer 122. The image-fixer 125 comprises an endless image-fixing belt 126 and a pressure roller 127 pressed on the image-fixing belt 126.

The tandem image forming apparatus further includes a sheet reverser 28 in the vicinity of the secondary image-transferer 122 and the image-fixer 125. The sheet reverser 28 is capable of reversing the transferring sheet so as to form images on both sides of the transferring sheet.

A full-color image (color copy) is formed by using the tandem image forming apparatus 220 in the following manner. Initially, a document is placed on a document platen 130 of the automatic document feeder (ADF) 400. Alternatively, the automatic document feeder 400 is opened, the document is placed on a contact glass 32 of the scanner 300, and the automatic document feeder 400 is closed to press the document.

When pushing a starting switch (not shown), the document placed on the automatic document feeder 400 is transported onto the contact glass 32. When the document is initially placed on the contact glass 32, the scanner 300 is immediately driven to operate a first carriage 33 and a second carriage 34. Light is applied from a light source to the document by action of the first carriage 33, and reflected light from the document is further reflected toward the second carriage 34. The reflected light is further reflected by a mirror of the second carriage 34 and passes through an image-forming lens 35 into a read sensor 36 to thereby read the color document (color image) and to produce black, yellow, magenta and cyan image information.

Each of the black, yellow, magenta and cyan image information is transmitted to each of the image forming devices 118 (black, yellow, magenta and cyan image forming devices) in the tandem image forming apparatus 220 to thereby form black, yellow, magenta and cyan toner images therein. Specifically, each of the image forming devices 118 (black, yellow, magenta and cyan image forming devices) in the tandem image forming apparatus 220 has a photoconductor 110 (black photoconductor 110K, yellow photoconductor 110Y, magenta photoconductor 110M or cyan photoconductor 110C), an electrostatic charger 60, a light irradiator, a image-developer 61, a transferring charger 62, a photoconductor cleaner 63, and a charge-eliminator 64 and can form a monochrome image (black, yellow, magenta or cyan image) based on the color image information. The charger 60 serves to charge the photoconductor uniformly. The light irradiator applies light to the photoconductor color-imagewise based on each color image information to thereby form a latent electrostatic image corresponding to the color image. The image-developer 61 develops the latent electrostatic image with a color developer (black, yellow, magenta or cyan developer) to thereby form a visible image. The transferring charger 62 transfers the visible image to the intermediate image-transfer member 50. The black image formed on the black photoconductor 110K, the yellow image formed on the yellow photoconductor 110Y, the magenta image formed on the magenta photoconductor 110M and the cyan image formed on the cyan photoconductor 110C are sequentially transferred (primary transferring) and superimposed onto the intermediate image-transfer member 50 rotated and shifted by the support rollers 114, 115 and 116. Thus, a composite color image (transferred color image) is formed.

One of feeder rollers 142 of the feeder table 200 is selectively rotated, sheets are ejected from one of multiple feeder cassettes 144 in a paper bank 143 and are separated by a separation roller 145 one by one into a feeder path 146, are transported by a transport roller 147 into a feeder path 148 in the copier main body 150 and are bumped against a resist roller 49. Alternatively, a feeder roller 150 is rotated to eject sheets on a manual bypass tray 51, the sheets are separated one by one by a separation roller 52 into a manual bypass feeder path 53 and are bumped against the resist roller 49. The resist roller 49 is generally grounded but can be used under the application of a bias to remove paper dust of the sheets.

In the image forming apparatus according to the present invention and the image forming method according to the present invention, the respectively employed toner cartridges according to the present invention can assure stable supply of toners into each developing part due to the improved rotating accuracy of toner bottles. In addition, since the mechanical strength of the gear for rotating the toner bottle can be increased, the disadvantage may be avoided that the toner cartridge should be exchanged due to an accidental damage of gears before all of the toner filled initially is consumed. Thus, images with high quality can be formed for longer period.

What is claimed is:

1. A toner bottle comprising:
   a cylindrical bottle having a bottom;
   a cylindrical aperture configured to supply toner; and
   a ring gear,
   wherein a helical concave is formed on the side wall of the cylindrical bottle along the axis of the cylindrical bottle,
   the cylindrical aperture is disposed at one end of the cylindrical bottle, the cylindrical aperture is concentric with the cylindrical bottle, and the outside diameter of the cylindrical aperture is smaller than the outside diameter of the cylindrical bottle,
   the ring gear is disposed on the cylindrical aperture, the ring gear is concentric with the cylindrical aperture, and the tip of the outside diameter of the ring gear is smaller than the outside diameter of the cylindrical bottle.

2. The toner bottle according to claim 1, wherein the ring gear is disposed from an end face of the cylindrical aperture by a space of 5 mm to 20 mm.

3. The toner bottle according to claim 1, wherein the difference between the outer diameter of the cylindrical bottle and the tip of the outside diameter of the ring gear is 1 mm to 10 mm.

4. The toner bottle according to claim 1, further comprising:
   a connecting and extending portion comprising a cylindrical aperture,
   wherein the connecting and extending portion is located at one end of the cylindrical bottle,
   wherein the inner diameter of the cylindrical aperture of the connecting and extending portion is smaller than the inner diameter of the cylindrical bottle,
   wherein the connecting and extending portion includes a spiral path configured to guide toner, and
   the ring gear is connected to the edge of the connecting and extending portion.

5. The toner bottle according to claim 1, wherein the tooth width of the ring gear is 2 mm or more.

6. The toner bottle according to claim 5, wherein the tooth width of the ring gear is 4 mm to 6 mm.

7. The toner bottle according to claim 1, wherein the ring gear is located on the cylindrical aperture, the wall thickness of the cylindrical aperture is thinner than the tooth width of the ring gear, the ring gear is comprised of a disk that is concentric with the cylindrical aperture and ring teeth that are concentrically connected to the outer edge of the disk, and
   the wall thickness W3 of the disk and the wall thickness W2 of cylindrical aperture satisfy the relation: W3=W2±2 mm.

8. The toner bottle according to claim 7, wherein the wall thickness W3 of the disk and the wall thickness W2 of cylindrical aperture are 1 mm to 4 mm respectively.

9. The toner bottle according to claim 1, wherein an aperture configured to feed toner is formed at the bottom of the cylindrical bottle,
   wherein the aperture is attached to a sheet-like or plate-like sealing member and,
   wherein the sealing member is configured to open and close the aperture to feed toner.

10. The toner bottle according to claim 1, wherein the toner bottle is a molded plastic and includes the a ring gear molded integrally with the cylindrical bottle.

11. The toner bottle according to claim 10, wherein the plastic is selected from the group consisting of polyethylene terephthalate resins, polyethylene resins, polypropylene resins, polyvinyl chloride resins, polyamide resins, polystyrene resins, and polycarbonate resins.

12. The toner bottle according to claim 1, further comprising:
    a linear rib formed on the side wall of the cylindrical bottle in parallel with the axis of the cylindrical bottle.

13. The toner bottle according to claim 1, further comprising:
    a flange located between the cylindrical aperture and the cylindrical bottle.

14. A toner container comprising a toner bottle and a cap, the toner bottle comprising:
    a cylindrical bottle having a bottom;
    a cylindrical aperture configured to supply toner; and a ring gear,
    wherein the cap is attached to the toner bottle, and covers the cylindrical aperture and its neighborhood while exposing teeth of the ring gear, and
    wherein a helical concave is formed on the side wall of the cylindrical bottle along the axis of the cylindrical bottle;
    the cylindrical aperture is disposed at one end of the cylindrical bottle, the cylindrical aperture is concentric with the cylindrical bottle, and the outside diameter of the cylindrical aperture is smaller than the outside diameter of the cylindrical bottle;
    the ring gear is disposed on the cylindrical aperture, the ring gear is concentric with the cylindrical aperture, and the tip of the outside diameter of the ring gear is smaller than the outside diameter of the cylindrical bottle.

15. The toner container according to claim 14, wherein a toner exit is provided at a site of the cap where the cap covers the cylindrical aperture, and a shutter is configured to open and close the toner exit.

16. The toner container according to claim 15, wherein the toner container is mounted to an image forming apparatus in an attachable and detachable manner through the cap.

17. A toner cartridge, comprising a toner container wherein the toner container comprises:
    a toner bottle;
    and a cap,
    wherein the toner bottle comprises:
       a cylindrical bottle having a bottom;
       a cylindrical aperture configured to supply toner; and
       a ring gear,
       wherein the cap, being attached to the toner bottle, covers the cylindrical aperture and its neighborhood while exposing the teeth of the ring gear;
       wherein a helical concave is formed on the side wall of the cylindrical bottle along the axis of the cylindrical bottle;
       the cylindrical aperture is disposed at one end of the cylindrical bottle, the cylindrical aperture is concentric with the cylindrical bottle, and the outside diameter of the cylindrical aperture is smaller than the outside diameter of the cylindrical bottle;
       the ring gear is disposed on the cylindrical aperture, the ring gear is concentric with the cylindrical aperture, and the tip of the outside diameter of the ring gear is smaller than the outside diameter of the cylindrical bottle.

18. An image forming apparatus comprising:
    a photoconductor, a latent electrostatic image forming unit configured to form an electrostatic image on the photoconductor, a developing unit configured to develop the latent electrostatic image by means of a toner to form a visible image, a transferring unit configured to transfer the visible image on a recording medium, and a fixing unit configured to fix the transferred image on the recording medium, wherein a toner cartridge is mounted to the image forming apparatus through a cap in an attachable and detachable manner, and toner is supplied from the toner cartridge, wherein the toner cartridge comprises a toner container filled with toner, the toner container comprises a toner bottle and the cap, the toner bottle comprises:
- a cylindrical bottle having a bottom;
- a cylindrical aperture configured to supply toner; and
- a ring gear, the cap, is attached to the toner bottle, covers the cylindrical aperture and its neighborhood while exposing teeth of the ring gear;

wherein a helical concave is formed on the side wall of the cylindrical bottle along the axis of the cylindrical bottle;

the cylindrical aperture is disposed at one end of the cylindrical bottle, the cylindrical aperture is concentric with the cylindrical bottle, and the outside diameter of the cylindrical aperture is smaller than the outside diameter of the cylindrical bottle;

the ring gear is disposed on the cylindrical aperture, the ring gear is concentric with the cylindrical aperture, and the tip of the outside diameter of the ring gear is smaller than the outside diameter of the cylindrical bottle.

* * * * *